United States Patent
Smith (10) Patent No.: US 8,204,243 B2
(45) Date of Patent: Jun. 19, 2012

(54) SYNTHETIC ENGINE SOUND FOR ELECTRIC VEHICLE BASED ON DETECTED DIRECTION OF TRAVEL

(75) Inventor: Steven L. Smith, Buford, GA (US)

(73) Assignee: United Parcel Service of America, Inc.

( * ) Notice: Subject to any disclaimer, the term of this patent is extended or adjusted under 35 U.S.C. 154(b) by 1265 days.

(21) Appl. No.: 11/859,201

(22) Filed: Sep. 21, 2007

(65) Prior Publication Data

US 2009/0080672 A1    Mar. 26, 2009

(51) Int. Cl.
*H04B 1/00* (2006.01)
*B60Q 5/00* (2006.01)
(52) U.S. Cl. .......................................... 381/86; 340/463
(58) Field of Classification Search .................... 381/61, 381/86; 340/463
See application file for complete search history.

(56) References Cited

U.S. PATENT DOCUMENTS

| 4,325,199 A | 4/1982 | McEdwards |
| 5,237,617 A | 8/1993 | Miller |
| 5,635,903 A * | 6/1997 | Koike et al. ................... 340/441 |
| 5,734,726 A | 3/1998 | Truchsess |
| 7,106,180 B1 * | 9/2006 | Pompei ...................... 340/384.7 |
| 2004/0170288 A1 | 9/2004 | Maeda |
| 2007/0182525 A1 | 8/2007 | McCarthy |

* cited by examiner

*Primary Examiner* — Vivian Chin
*Assistant Examiner* — Kile Blair
(74) *Attorney, Agent, or Firm* — Alston & Bird LLP (57) ABSTRACT

A vehicle enunciator includes a storage device having sound data, a vehicle speed portion, an accelerator portion, and at least one speaker. The vehicle enunciator may be configured or attached to a vehicle, such as an electric car. The vehicle speed portion detects the speed of a vehicle, while the accelerator portion detects the position of the accelerator pedal of the vehicle. Using the outputs from the vehicle speed portion and accelerator portion, the sound data from the storage device is adjusted with regards to frequency and amplitude, respectively. At least one speaker then produces sound based upon the adjusted sound data.

17 Claims, 7 Drawing Sheets

SYNTHETIC ENGINE SOUND FOR ELECTRIC VEHICLE BASED ON DETECTED DIRECTION OF TRAVEL

BACKGROUND OF THE INVENTION

In the field of automotive safety, there are several systems that indicate the presence or motion of a vehicle to persons in the local area of the vehicle. For example, a horn can be used by the driver as a manually operated signal. Also, beepers or lights can be automatically activated, particularly upon shifting the vehicle into reverse. The one pervasive indicator of the presence of a vehicle is sound vibrations produced by the internal combustion engine, which can be detected by a person even from hundreds of feet away. Further, an indication of speed or acceleration of a vehicle can be determined from the engine sound.

However, electric vehicles can be very quiet in operation since they have no internal combustion engine to produce noticeable engine sounds. Hence, it becomes more difficult for persons in the vicinity to detect a vehicle. Therefore, a safety issue arises because of the lack of noise from an electric vehicle. For example, delivery vehicles generally pickup deliveries at a central hub or station. The central hub or station is often a dangerous place for workers and others because of the constant movement of vehicles. With internal combustion engines, workers are at least alerted by noise of approaching vehicles. However, electric vehicles may not provide the warning signal that internal combustion engines provide. Therefore, delivery workers would encounter a more dangerous loading environment using electric vehicles because of the lack of noise.

There have been efforts to emulate vehicle sounds. For instance, U.S. Pat. No. 5,237,617 to Miller ("Miller") discloses a sound effects generator for a vehicle involving a signal synthesizer system. Miller is directed to imitating engine sound signatures of high-performance automobiles. Signals are generated in response to detectors that detect the operating conditions of a vehicle, such as the exhaust and throttle position. An analyzer receives the signals and combines and analyzes them to produce a digital signal representing the operating conditions of the vehicle. The output from the analyzer is applied over a lead to a digital synthesizer. Also, signal outputs from a microchip card processor are applied over a lead to the digital synthesizer. The microchip card processor may have a slot receptacle that can receive a programmed microchip card. The signals from the card and signals from the analyzer are combined to produce digital output signals that can be converted into analog signals. These analog signals can be run through speakers and produce sounds that emulate a vehicle.

Miller utilizes a digital synthesizer to produce sounds representative of a vehicle. However, the need still exists for a simplified vehicle enunciator that can produce sounds using sound data.

BRIEF SUMMARY OF THE INVENTION

Embodiments of the invention may address the above needs and achieve other advantages by providing apparatus and methods for formation of an engine sound. Generally, embodiments of the present invention provide an apparatus and methods for forming an engine sound for a vehicle. In particular, an engine sound is selected based upon the speed of the vehicle and position of the accelerator pedal.

In one embodiment of the invention, a method of producing an engine sound includes the steps of measuring speed of a vehicle, measuring position of the accelerator pedal of the vehicle, producing sound data from a storage device based at least partially on the measured speed of the vehicle and the measured position of the accelerator pedal of the vehicle, and producing at least one engine sound from at least one speaker based on the sound data. The method of producing an engine sound may further include the steps of detecting the direction of travel of the vehicle to generate direction data used to produce the sound data and selecting at least one speaker to produce at least one engine sound based at least partially on the detected direction of travel of the vehicle. Also, the method of producing an engine sound may include the step of transmitting the sound data from the storage device to at least one speaker.

In another embodiment of the invention, an engine sound apparatus for use with a vehicle includes an accelerator portion configured to generate accelerator pedal position data, a vehicle speed portion configured to generate vehicle speed data, a processor portion configured to transmit sound data from a storage device based at least partially on accelerator pedal position data and speed data, and at least one speaker configured to receive engine sound data and to generate engine sound based on the engine sound data. The sound data may be synthetic and created from selected amplitude values. The vehicle speed portion may be further configured to transmit vehicle speed data to the processor portion for use in generating the engine sound data. The processor portion may generate the frequency of the engine sound data based on vehicle speed data. The accelerator portion may be further configured to transmit pedal position data to the processor portion for use in generating the engine sound data. The processor portion may generate the amplitude of the engine sound data based on pedal position data. The apparatus may include speakers positioned in opposition on the front and back sides of the vehicle. The processor portion may be implemented in a vehicle control system (VCS) of the vehicle. The engine sound apparatus may further include a direction portion configured to detect a direction of travel of the vehicle and transmit direction data to the processor portion, which may be further configured to select at least one speaker (e.g., front or back) to produce at least one engine sound based at least partially on the detected direction of travel of the vehicle. The engine sound apparatus may still further include a switch that is configured to activate and deactivate at least the processor portion of the engine sound apparatus. The engine sound apparatus may also include a storage device for storing the sound data in digital or analog form.

In still another embodiment of the invention, a system includes a vehicle and an engine sound apparatus adapted to be attached to at least a portion of the vehicle. The engine sound apparatus includes an accelerator portion configured to generate accelerator pedal position data, a vehicle speed portion configured to generate vehicle speed data, a processor portion configured to generate and transmit sound data based at least partially on accelerator pedal position data and speed data, and at least one speaker configured to receive engine sound data. The vehicle speed portion may be further configured to transmit vehicle speed data to the processor portion for use in generating the engine sound data. The engine sound data may be continuously generated based upon the vehicle speed data. The processor portion may repeatedly output the waveform defined by the sound data with a frequency determined by the vehicle speed data. The accelerator portion may be further configured to transmit pedal position data to the processor portion and to generate engine sound based on the pedal position data. The processor portion may generate the amplitude of the engine sound data it outputs based on the pedal position data. The engine sound apparatus may further include a direction portion configured to generate and transmit direction data indicating the direction of travel of a vehicle to the processor portion for use in generating engine sound. The processor portion may be further configured to select at least one speaker to produce at least one engine sound based at least partially on the direction data. The system may include opposing speakers positioned on the front and back sides of the vehicle. The vehicle may be an electric vehicle. The processor portion may be implemented in a vehicle control system (VCS) of the vehicle. The engine sound apparatus may further include a switch that is configured to activate and deactivate the engine sound apparatus. The engine sound apparatus may still further include a microphone that is configured to detect sound produced by the at least one speaker.

In still another embodiment of the invention, an engine sound apparatus for use with a vehicle includes a storage device that can store an engine sound signal, a voltage-to-frequency converter (VFC) that can receive the engine sound signal and a vehicle speed signal, an amplifier that can receive an engine sound signal generated by the VFC, which has a frequency dependent upon the vehicle speed signal, and an accelerator position signal, and one or more speakers. The amplifier may amplify the engine sound signal based upon the accelerator position signal. Also, the speaker(s) may receive the engine sound signal from the amplifier and generate acoustic waves based upon the signal. The engine sound apparatus may also include a switch or balancer that receives engine sound signals from the amplifier and a direction-of-travel signal. The switch or balancer may output the engine sound signal to the speakers based on the direction-of-travel signal.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
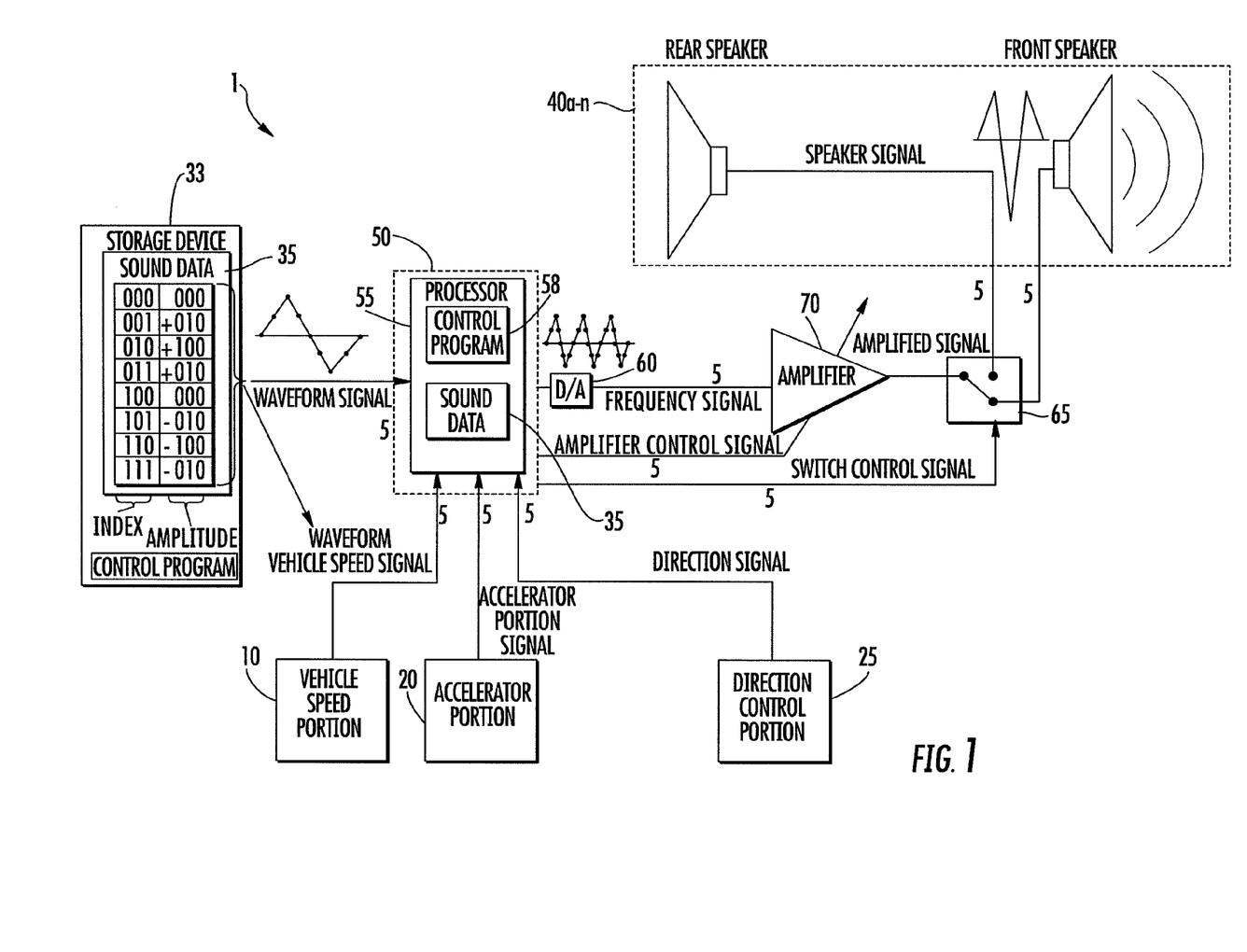
FIG. 1 is a diagram of components of one embodiment of the present invention.

In FIG. 1, there is shown a basic diagram of the present invention which comprises a vehicle enunciator 1. The vehicle enunciator 1 includes a vehicle speed portion 10 and an accelerator portion 20. The vehicle speed portion 10 may include a sensor, such as a tachometer, pulse generator installed in the transaxle of a vehicle, or other speed measuring device. The accelerator portion 20 may include a throttle position sensor, such as a potentiometer that transforms the throttle position into output voltage or other type of sensor that measures the position of the accelerator.

In addition, the vehicle enunciator 1 includes a sound signal or data 35 stored in a storage device 33. As seen in FIG. 1, the vehicle speed portion 10 and an accelerator portion 20 are connected to a processor portion 50 through leads 5. The various parts of the vehicle enunciator 1 may be connected by various types of leads 5, including wires, various forms of wireless communication, or other types of connections. The sound data or signal 35 may be analog or digital and may be stored in a storage device 33. As used herein "storage device" is used broadly and may include a register, latch, memory (including ROM, RAM, Flash, EEPROM, etc.), quantum memory, magnetic tape, hard disk or platter, compact disc (CD), digital versatile disc (DVD) or any other type of data or signal storage unit. Generally, an analog based sound signal 35 may include a tape, a motor with shaft and electromagnetic pickup, or the like. Of course, a storage device 33 capable of storing both analog and digital based sound data 35 may also be used. The sound data 35 of the present invention is not generated by sampling an engine's sound or using a synthesizer. The sound data 35 may be synthetic. In fact, the sound data 35 may be created from selected amplitude values. The amplitude values may be stored in association with indexes in successive locations of a memory. A processor 55 may use the indexes to read the amplitude values as the base waveform for generating engine sound, as will be described in further detail in a subsequent section. In the simplified example given in FIG. 1, the storage device 33 holds the sound data 35 in a series of memory locations defined by binary indexes 000, 001, 010, 100, 101, 110, 111. Amplitude data 000, +010, +100, +010, 000, −010, −100, −010 in binary format are stored in the sound data 35. In this simplified example, the sound data 35 defines a waveform that is saw-toothed. The sound data 35 thus defines the basic waveform which the processor portion 50 uses to define the output waveform provided to one or more speakers 40a-n to produce an engine sound. It should be understood that this is a simplified example of how the sound data 35 can be defined, and a desired waveform may be a more complex series of amplitude data. The sound data 35 may be downloadable and user selectable. For example, a user may download engine sound data 35 from the internet. Also, a user may be able to select a certain sound data 35 as the engine sound to be played by the vehicle enunciator 1. The user may be able to choose between different types of sound data 35 stored in the storage device 33 through the use of a computer having a user interface or other device.

The vehicle enunciator 1 may be configured with a processor portion 50 connected to the storage device 33 so that it can access the sound data 35. A processor 55 may have a control program 58 which it executes to carry out its functions, as will be described in further detail later in this document. The processor portion 50 is configured to receive data from the vehicle speed portion 10, accelerator portion 20, direction of travel portion 25, and the storage device 33. The processor portion 50 may facilitate the adjustment of the sound data 35 properties based upon the data received from the vehicle speed portion 10 and accelerator pedal portion 20. The processor portion 50, with or without a storage device 33, may be contained within, retrofitted to fit within, or built into a vehicle control system (VCS), such as an electronic control module (ECM) or other similar device that controls various aspects of an engine's operation. Of course, a storage device 33, with or without a processor portion 50, may be contained within, retrofitted to fit within, or built into a VCS, such as an ECM or other similar device that controls various aspects of an engine's operation. The processor portion 50 may be configured with a processor 55 which can be a digital signal processor, microcontroller, field programmable gate array, microprocessor, or other computing element or device, for example.

The processing portion 50 uses the outputs from the vehicle speed portion 10 and accelerator portion 20 to adjust the properties of the waveform represented by sound data 35, namely, its frequency and amplitude. In particular, the vehicle speed portion 10 affects the frequency at which the processor portion 50 generates or repeatedly outputs the sound data 35. The frequency of the sound data 35 (or pitch) increases with an increase in the measured vehicle speed. The accelerator portion 20 affects the amplitude of the sound data 35 (or loudness of the sound). The more displaced the accelerator position is measured to be, the greater the amplitude at which the processor 55 outputs the engine sound data 35, and thus the louder the sound generated by the vehicle enunciator 1.

As shown in FIG. 1, the vehicle enunciator 1 may also include a direction of travel portion 25. The direction of travel portion 25 senses the direction of travel of whatever vehicle the vehicle enunciator 1 is attached to or configured within. The direction of travel portion 25 may include any type of sensor or system configured to detect the forward or backward movement of the vehicle to which it is attached, or a forward-reverse vehicle control switch or a gear shift, for example. Upon detecting the forward or backward movement of the vehicle, or switch or gear shift position, the direction of travel portion 25 transmits a direction signal to the processor portion 50. The processor portion 50 can be configured or programmed to use the direction signal to control which speaker 40a-n will produce the sound. For instance, the direction of travel portion 25 could detect whether a delivery car with a vehicle enunciator 1 was backing up or traveling forward. If the direction of travel portion 25 detects that the delivery car is backing up, then the processor 50 uses the direction-of-travel signal from the portion 25 to produce a switch control signal provided to switch or balancer 65 which directs the sound data 35 to be sent to a particular speaker 40a-n, such as the speaker that is located near the rear of the delivery car. On the other hand, if the direction of travel portion 25 detects that the delivery car is moving forward, then the processor portion 50 produces the switch control signal to switch or balancer 65 which causes the sound data 35 to be sent to a particular speaker 40a-n, such as the speaker that is located near the front of the delivery of the car. Of course, the sound data 35 may be sent to several speakers 40a-n. In addition, the sound produced by each speaker 40a-n may be at different amplitudes depending on the direction of travel. In this way, the speakers 40a-n could be controlled just like balance adjustment in a typical car controls the sound volume between front and rear speakers.

Depending upon the user selected or hardwired mode of operation, the sound data 35 may be continuously or intermittently transmitted from the storage device 33. The sound data 35 may be transmitted to speakers 40a-n. If the sound data 35 is digital, then the sound data 35, i.e., bytes, may be converted into sound waves using a digital-to-analog converter 60. At least one electronic amplifier 70 may be used to boost the sound waves prior to being received at the speakers 40a-n. The speakers 40a-n produce sound based upon the sound data 35 that is typically received from an amplifier 70. The processor portion 50 can generate an amplifier control signal based on the accelerator position signal to control the amplification of the engine sound data 35 it outputs to the amplifier 70.

Speakers 40a-n may be positioned anywhere within or on the outside of a vehicle. The speakers 40a-n may simply be speakers that are standard for vehicles. Alternatively or in addition, speakers 40a-n may be positioned outside of the cabin portion of the vehicle so that pedestrians and others outside of the vehicle may more easily hear and feel the sound produced by the vehicle enunciator 1. Of course, if the speakers 40a-n are positioned outside of the cabin portion and subjected to outside elements, then the speakers 40a-n may be weatherproof or in some way shielded from the outside elements.

Figure 2:
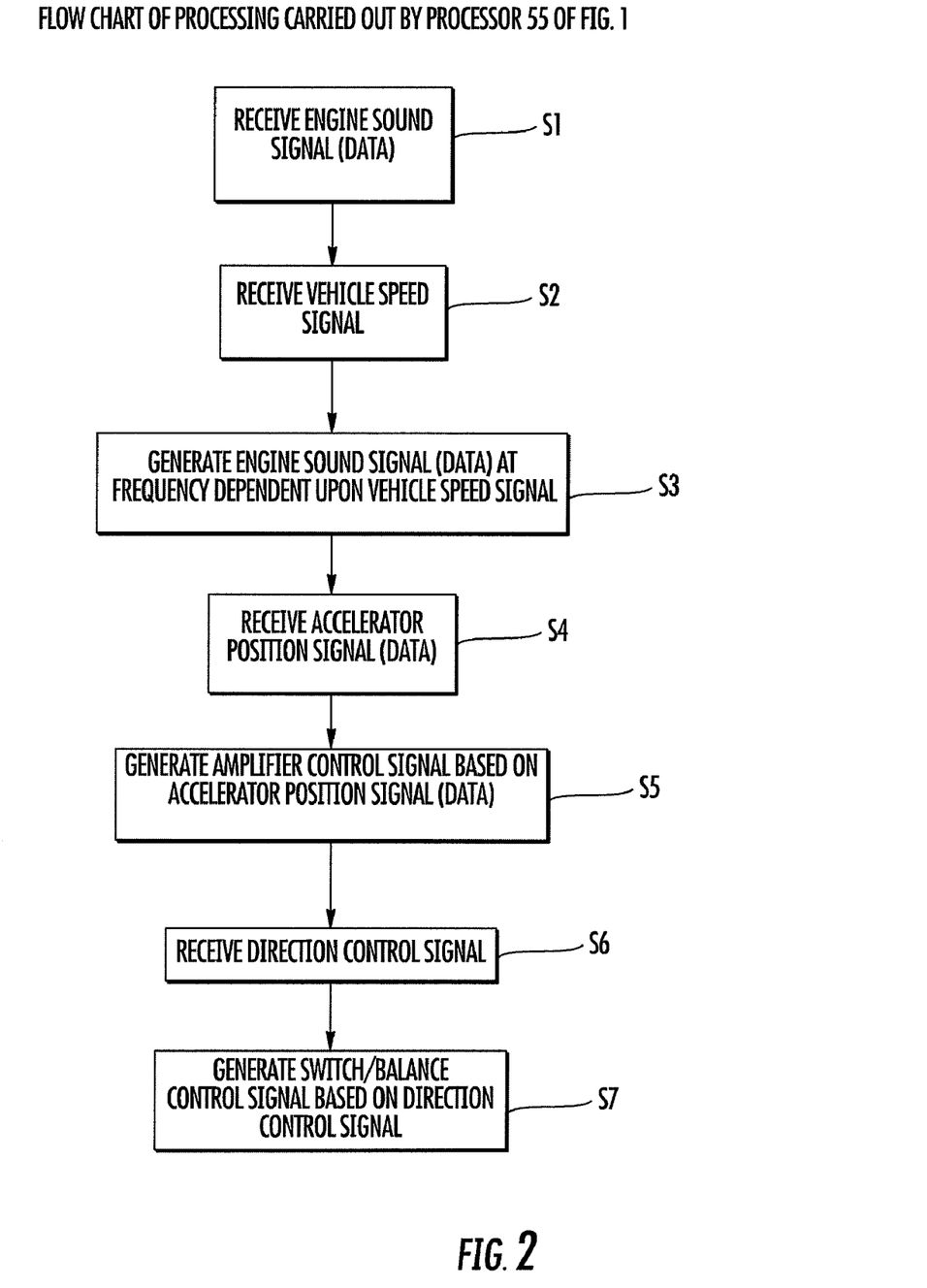
FIG. 2 is a flow chart of processing carried out by a processor in the present invention.

FIG. 2 is a flowchart of processing carried out by the processor 55 of FIG. 1 as it executes its control program 58. In Step S1, the processor 55 receives the engine sound signal 35 from the storage device 33. In Step S2, the processor 55 receives the vehicle speed signal from the vehicle speed portion 10. In Step S3, the processor 55 generates the engine sound data 35 with a frequency dependent upon the vehicle speed signal. The processor 55 outputs the resulting signal to the amplifier 70. In Step S4, the processor 55 receives the accelerator position signal from the accelerator portion 20. In Step S5, the processor 55 generates an amplifier control signal based on the accelerator position signal from accelerator portion 20. The processor 55 outputs the resulting signal to switch/balancer unit 65. In Step S6, the processor 55 receives the direction control signal. In Step S7, the processor 55 generates the switch/balance control signal based on the direction control signal. The processor 55 outputs the resulting signal to the switch/balancer 65. The processor 55 repeats steps S1-S7 continuously or periodically during operation. For example, these steps may be carried out once every 0.25 milliseconds or less to produce an engine sound within audible range.

Figure 3:
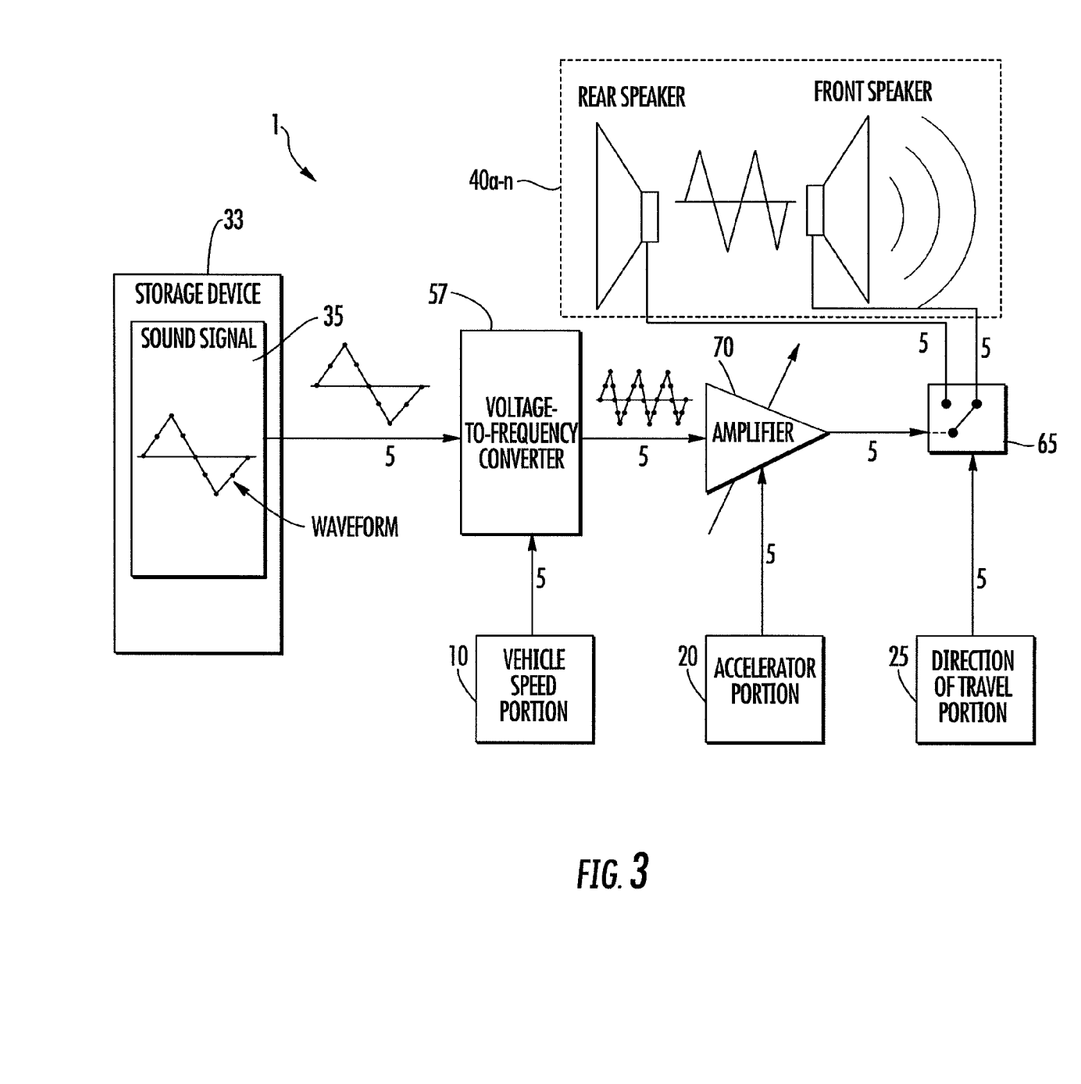
FIG. 3 is a diagram of components of another embodiment of the present invention.

FIG. 3 is an alternative embodiment of the vehicle enunciator 1 which may be regarded as an analog or hybrid digital/analog configuration. In this embodiment, the processor portion 50 is replaced with a voltage-to-frequency converter (VFC) 57. The VFC is connected to receive engine sound data 35 from the storage device 33 which defines the waveform to be output. The VFC is also connected to receive a voltage-defined vehicle speed signal from the portion 10. Based on the voltage level of this signal, whose magnitude represents the vehicle's speed, the VFC uses the engine sound signal to generate an output waveform with a frequency that depends upon the vehicle's speed as represented by the vehicle speed signal. The resulting signal the VFC outputs to the amplifier 70 for amplification. The amplifier 70 is connected to receive an accelerator position signal from the accelerator portion 20, which it uses to determine the degree of amplification to be applied to the engine sound signal 35. The amplifier 70 outputs the amplified engine sound signal to switch or balancer 65. The unit 65 is further connected to receive the direction-of-travel signal from portion 25 and directs the engine sound data 35 to the one or more speakers 40a-n which convert the electrical engine sound signal into audible acoustic waves.

Figure 4:
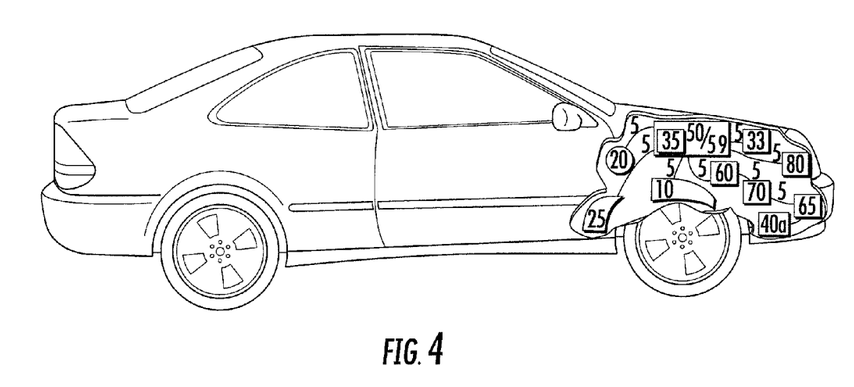
FIG. 4 is a block diagram of components of the present invention configured in a vehicle.

The vehicle enunciator 1 of any of the embodiments disclosed herein may be attached to or configured within various types of vehicles, including cars, trucks, motorcycles, electric vehicles, and the like. An example of a vehicle enunciator 1 configured within a car is shown in FIG. 4. All of the components of the vehicle enunciator 1 may include some type of protective device or housing, which may defend against heat, radiation, rain, oil, and/or many other potentially harmful substances or forms of energy.

Figure 5:
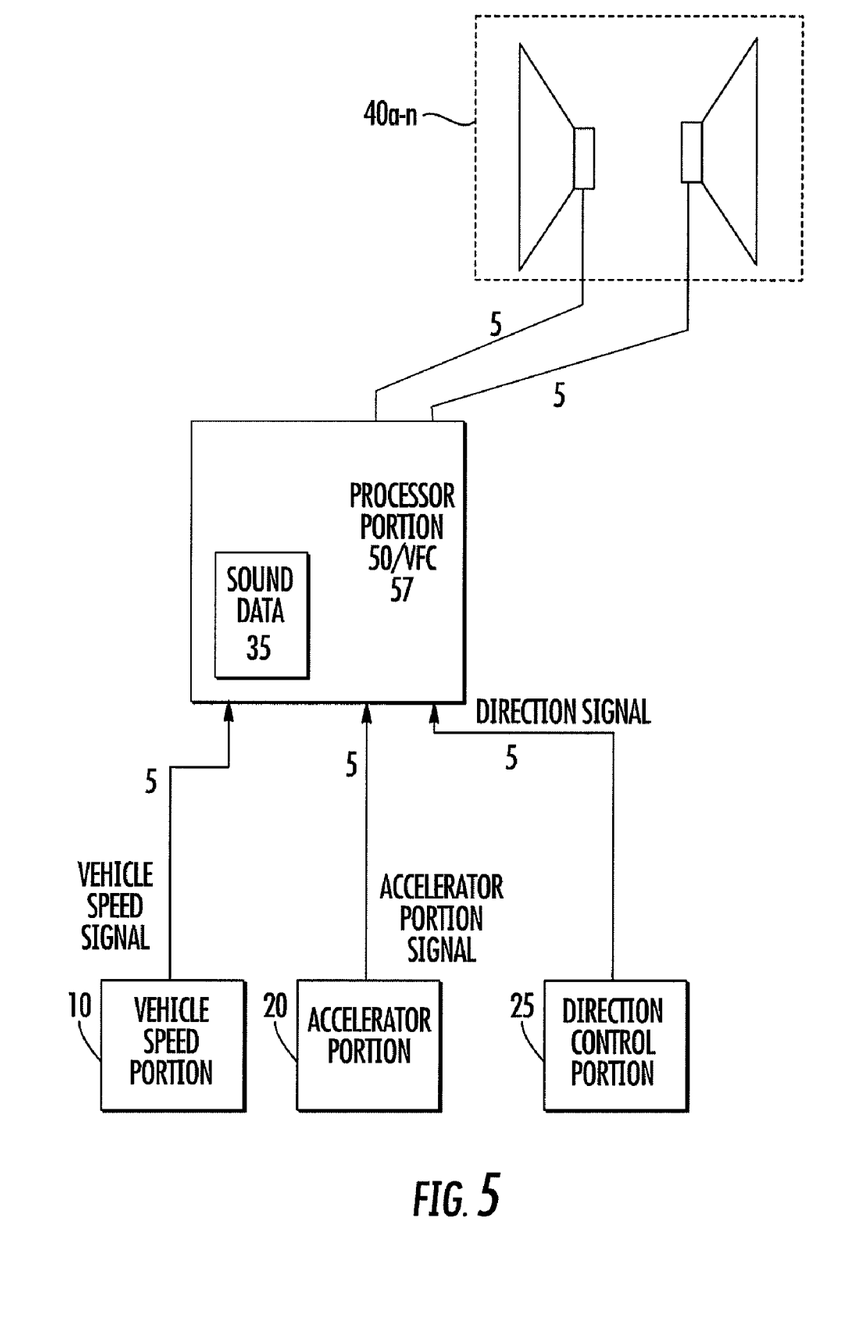
FIG. 5 is a block diagram of components of still another embodiment of the present invention.

It should be noted that the sound data 35 may be configured to be part of the processor portion 50 or VFC 57, such as attached thereto or fitted within, such as in a register, latch or memory. See, for example, FIG. 5.

Returning to FIG. 4, the vehicle enunciator 1 is shown to include a microphone 80 configured to detect sounds produced by the speaker 40$a$. Of course, multiple microphones 80 may be used to detect sounds from multiple speakers 40$a$-$n$. The microphone 80 may transmit data relating to the detected sounds to a testing device (not shown), to a processor portion 50, VFC 57, storage device 33, or the like. The testing device may be configured to compare the sounds detected by the microphone 80 with a control sound, which may be sound received directly from the processor portion 50 or may be a prerecorded sound. Upon a determination that there is a discrepancy between the detected sound and a control sound, the testing device may signal an alarm to the processor portion 50 to cure the discrepancy. A discrepancy may include a difference in frequency, amplitude, or other features of the sound detected by the microphone 80 and a control sound. A discrepancy may occur when the difference in a feature or features of the sounds are greater than predetermined values, which may be user selected or hardwired for the particular feature. Upon receiving the signal of a discrepancy, the processor portion 50 may cure the discrepancy by, for example, performing quality control checks of components of the vehicle enunciator, such as the speakers 40$a$-$n$ and various other components. If the quality control checks reveal a component that is not functioning properly, then the processor portion 50 or other device may transmit a warning signal to a light on the vehicle's dashboard or other ways of alerting the driver. In addition or alternatively, the processor portion 50 or other device may restart the system or the like. Accordingly, microphones 80 provide a quality check on the sound produced by speakers 40$a$-$n$.

Microphones 80 may be positioned on various locations of a vehicle, including the outside of the vehicle or inside the vehicle cabin. Microphones 80 may be any type of microphone, including a directional microphone. Of course, microphones 80 configured to operate on the exterior of the vehicle may be weatherproof and appropriately positioned so that the sound produced by the external speaker or speakers can be detected.

Figure 6:
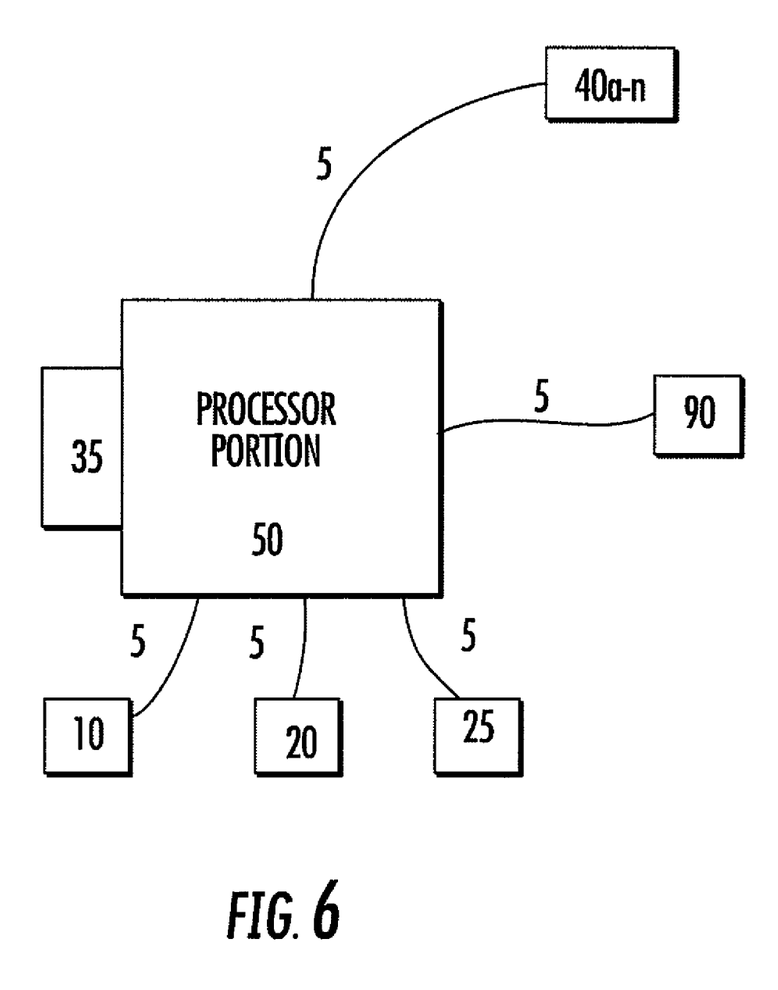
FIG. 6 is a block diagram of components of yet another embodiment of the present invention.

The vehicle enunciator 1 may include a switch 90 that allows for the activation and deactivation of the vehicle enunciator 1 or parts thereof. The switch 90 may act to deactivate the processor portion 50 or VFC 57, speakers 40$a$-$n$, vehicle speed portion 10, accelerator portion 20, direction of travel portion 25, D/A converter 60, amplifier 70 or various combinations of parts of the vehicle enunciator 1. In FIG. 6, for example, the switch 90 is configured to activate or deactivate the processor portion 50. The switch 90 may behave like an airbag switch in a car, i.e., the switch defaults to an activated mode. However, an occupant of the vehicle may be able to override this default by flipping the switch 90 in order to deactivate the vehicle enunciator 1.

Figure 7:
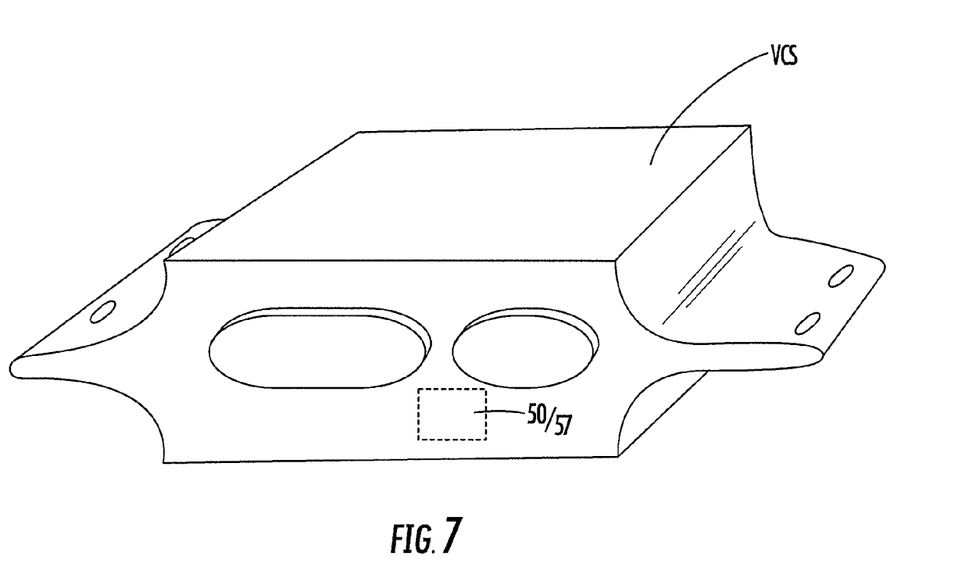
FIG. 7 illustrates a processor portion configured within a vehicle control system.

FIG. 7 is an embodiment of the vehicle enunciator 1 in which at least the processing portion 50 or VFC 57 is embedded or integrated in a VCS which controls the operation of a vehicle. Typically, this unit is mounted under-dashboard with a standard connection interface to the electrical system of the vehicle. Integrating components of the vehicle enunciator 1 in the VCS may have benefits where mass production is contemplated, for example. The processing portion 50 or VFC 57 and/or other components of the vehicle enunciator 1 may receive power from the vehicle's electrical system. On the other hand, the components of the vehicle enunciator 1 may receive power from other sources, such as batteries or the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An engine sound apparatus for use with a vehicle, comprising:
    an accelerator portion configured to generate accelerator pedal position data;
    a vehicle speed portion configured to generate vehicle speed data;
    a processor portion configured to transmit sound data from a storage device based at least partially on accelerator pedal position data and speed data;
    at least one speaker configured to receive engine sound data and to generate engine sound based on the engine sound data; and
    a direction portion configured to detect a direction of travel of the vehicle, wherein the processor portion is further configured to select at least one speaker to produce at least one engine sound based at least partially on the detected direction of travel of the vehicle.

2. The engine sound apparatus of claim 1, wherein the sound data is synthetic.

3. The engine sound apparatus of claim 2, wherein the sound data is created from selected amplitude values.

4. The engine sound apparatus of claim 1, wherein the vehicle speed portion is further configured to transmit vehicle speed data to the processor portion for use in generating the engine sound data.

5. The engine sound apparatus of claim 1, wherein the accelerator portion is further configured to transmit pedal position data to the processor portion for use in generating the engine sound data.

6. The engine sound apparatus of claim 1, wherein the direction portion is further configured to transmit direction data to the processor portion for use in generating the engine sound data.

7. The engine sound apparatus of claim 1, further comprising a switch that is configured to activate and deactivate at least the processor portion of the engine sound apparatus.

8. The engine sound apparatus of claim 1, wherein the at least one speaker comprises opposing speakers positioned on the front and back portions of the vehicle.

9. A system comprising:
    a vehicle; and
    an engine sound apparatus adapted to be attached to at least a portion of the vehicle comprising
        an accelerator portion configured to generate accelerator pedal position data;
        a vehicle speed portion configured to generate vehicle speed data;

a processor portion configured to generate and transmit sound data from a storage device based at least partially on accelerator pedal position data and speed data;

at least one speaker configured to receive engine sound data and a direction portion configured to detect a direction of travel of the vehicle, wherein the processor portion is further configured to select at least one speaker to produce at least one engine sound based at least partially on the detected direction of travel of the vehicle.

10. The vehicle with an engine sound apparatus of claim 9, wherein the vehicle speed portion is further configured to transmit vehicle speed data to the processor portion for use in generating the engine sound data.

11. The vehicle with an engine sound apparatus of claim 10, wherein engine sound data is continuously generated based upon the vehicle speed data.

12. The vehicle with an engine sound apparatus of claim 9, wherein the accelerator portion is further configured to transmit pedal position data to the processor portion and to generate engine sound data based on the pedal position data.

13. The vehicle with an engine sound apparatus of claim 9, wherein the direction portion is further configured to transmit direction data indicating the direction of travel of a vehicle to the processor portion for use in generating engine sound data.

14. The vehicle with an engine sound apparatus of claim 9, wherein the vehicle comprises an electric vehicle.

15. The vehicle with an engine sound apparatus of claim 9, wherein at least the processor portion is implemented in a vehicle control system (VCS) of the vehicle.

16. The vehicle with an engine sound apparatus of claim 9, further comprising a microphone configured to detect sound produced by the at least one speaker.

17. An engine sound apparatus for use with a vehicle, comprising:

a storage device storing an engine sound signal;

a voltage-to-frequency converter (VFC) connected to receive the engine sound signal and a vehicle speed signal, the VFC generating the engine sound signal with a frequency dependent upon the vehicle speed signal;

an amplifier connected to receive the engine sound signal from the VFC and an accelerator position signal, the amplifier amplifying the engine sound signal based on the accelerator position signal;

one or more speakers connected to receive the engine sound signal from the amplifier and generate acoustic waves based on the engine sound signal; and a switch/balancer connected to receive the engine sound signal from the amplifier, the switch/balancer connected to receive a direction-of-travel signal, the switch/balancer outputting the engine sound signal to the speakers based on the direction-of-travel signal.

* * * * *